United States Patent [19]

Hennig et al.

[11] 4,163,591

[45] Aug. 7, 1979

[54] FLEXIBLE COVERING FOR POWER SUPPLY LINES, GUIDEWAYS AND THE LIKE

[76] Inventors: Kurt Hennig, Georgensteinstr. 16, 8000 Munich 71; Manfred Klein, Böhmerwaldstr. 11, 8045 Ismaning, both of Fed. Rep. of Germany

[21] Appl. No.: 859,045

[22] Filed: Dec. 9, 1977

[30] Foreign Application Priority Data

Dec. 14, 1976 [DE] Fed. Rep. of Germany ....... 2656622

[51] Int. Cl.² .................... B23Q 11/08; H02G 11/00
[52] U.S. Cl. .................................................. 308/3.5
[58] Field of Search ..................... 308/3.5, 3 R, 6 R

[56] References Cited

U.S. PATENT DOCUMENTS 2,652,737  9/1953  Longstreet ..................... 308/3.5 X
3,785,418  1/1974  Hennig et al. .................. 308/3.5 X
3,920,288  11/1975  Ito ................................. 308/3.5

Primary Examiner—Douglas C. Butler
Attorney, Agent, or Firm—Marshall & Yeasting

[57] ABSTRACT

Two flexible chains, each of which is composed of links connected by hinge pins, form the lateral sides of the cover. Each link of one chain is connected to an opposite link of the other chain, at least at the top, by a rigid cover member to form a cover section. The cover members of adjacent cover sections are in sliding contact, and at least one surface which participates in each such sliding contact is in the form of a sector of a cylinder whose axis is in alignment with the hinge pins connecting the links forming the sides of such adjacent cover sections. Adjacent cover sections also are provided with opposed stops which limit the angle of relative pivoting of such adjacent cover sections.

16 Claims, 12 Drawing Figures

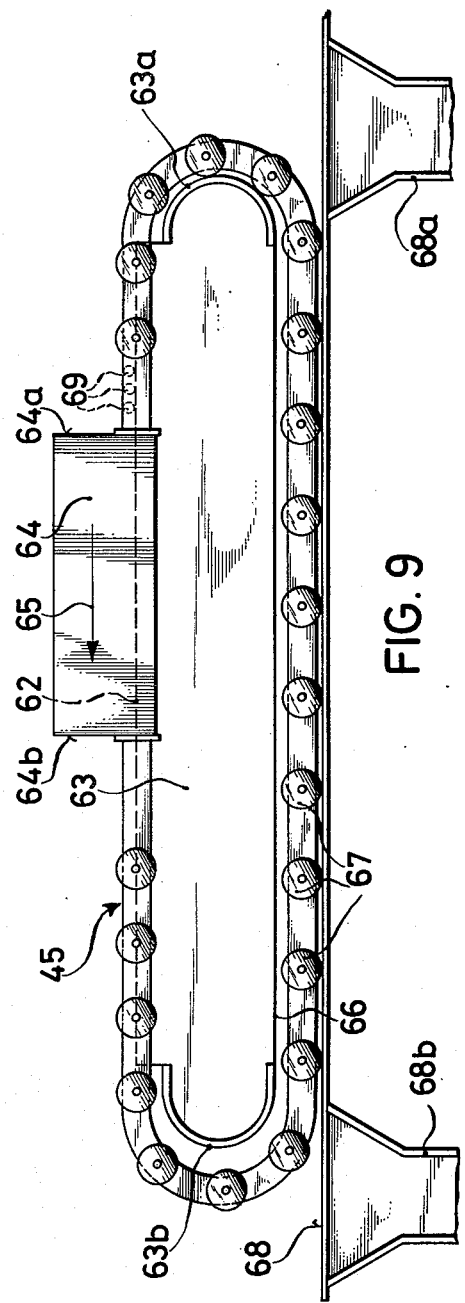
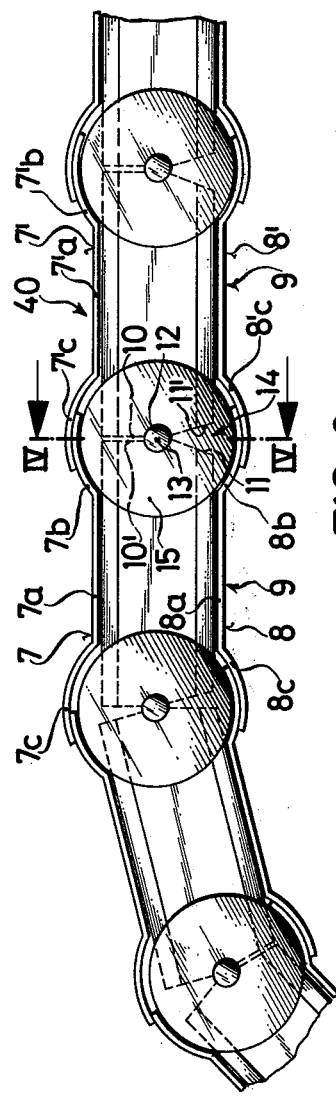
FIG. 9
FIG. 3

FLEXIBLE COVERING FOR POWER SUPPLY LINES, GUIDEWAYS AND THE LIKE

BACKGROUND OF THE INVENTION

The invention relates to a flexible covering for power supply lines, machine tool guideways, spindles and the like, comprising a plurality of cover sections which are hinged to each other and have stops which determine on the one hand the extended position and on the other hand the minimum radius of curvature of the cover.

Telescopic steel covers are known for machine tool guideways, columns, spindles, shafts and other similar devices, wherein the individual box-like covering members are traversable in a straight line. If the telescopic steel cover is, for example, moved together with the movable part of the machine beyond the guideway, then a suitable support has to be provided to take up the weight of the cantilever telescopic steel covering. The great disadvantage of such an arrangement is to be found in the cost of the supporting structure as well as the space required by the telescopic steel cover when in its drawn-out position. On the other hand, any means of extending the guideway is likewise very expensive.

Covers (cf. the laid-open German patent application DT-OS No. 20 20 108) are also known for guideways and other parts of machine tools which consist of sections flexibly joined together, wherein the adjacent sections are connected by means of coupling bosses which engage in recesses of the adjacent member in such a manner that two extreme swivelling positions are limited (of which the one determines the extended position of the cover, and the other the minimum radius of curvature of the cover when in the curved state.) Such a self-supporting cover avoids the disadvantages of the previously described construction, as a special support structure for the part of the cover projecting beyond the guideway is not required and the space required for the cantilever part of the cover can be considerably reduced. However, the fabrication of the individual sections of such a cover with their axially symmetrical coupling bosses and coupling recesses involves considerable expense, and the sides of the guideway are not covered by this arrangement.

Moreover, movable covers are also known (in the form of self-supporting power supply chains, cf. German utility model No. 66 00 307) for accommodating power supply lines, wherein chain links which are hinged together come into engagement in pairs and have trapezoidal front edges, thereby limiting the extended position, on the one hand, and the minimum radius of curvature of the cover, on the other. Cover arrangements of this kind are so rigid that they can be walked on by the operating personnel. The known construction, however, have the disadvantage that the opening and closing gap between co-operating stop edges presents an exceptionally great danger of accidents occurring when the cover arrangement is moved.

This accident hazard is avoided by another known cover for power supply lines (cf. German patent specification No. 15 74 369) wherein the individual cover sections that are hinged together are largely sealed off from the outside. For this purpose, resilient cover plates are provided on the upper side (or outside) and the lower side (or interior) of the cover, which are capable of flexible distortion in the curvature zones of the cover and which are thus constantly in contact with each other, irrespective of the angle between adjacent cover sections. The disadvantage of this arrangement is that the necessity of designing the cover plates to be flexible and resilient excludes any construction which attains a high degree of rigidity. In particular the cover plates cannot be designed to be so flexibly resilient, on the one hand, that they remain in contact in all swivel positions, and yet sufficiently rigid, on the other hand, for the cover arrangement to be walked on without difficulty when of large overall width.

SUMMARY OF THE INVENTION

The object of the invention is to provide a flexible covering which overcomes the aforesaid shortcomings while at the same time fulfilling the following requirements:

(a) the flexible cover should be suitable for protecting guideways, spindles and similar equipment, as well as power supply lines;

(b) the gap formed by the swivelling motion of adjacent cover sections between the stops limiting their motion should be faultlessly covered from the outside so as to meet the requirements of accident prevention;

(c) the cover should be designable to provide any desired level of rigidity, in particular to be rigid enough to be walked on;

(d) finally, the cover should be functionally simple to manufacture.

These objects are achieved according to the invention in that the two lateral sides of the cover are constituted by two sling chains, and opposite members of both chains are connected together by a rigid cover member into a cover unit, at least in the proximity of the upper section of the cover, and in that, in each pair of successive cover members which are in sliding contact at least one cover member exhibits a contact surface that forms part of a cylindrical surface around the connecting hinge pin of these two cover members.

Accordingly, it is a characteristic of the invention that for the first time a pair of sling chains (which are already known in the field of power supply chains) are combined together by rigid cover members which connect the individual chain links in pairs, said cover members being designed so that they remain in perfect sliding contact with one another even during swivelling movement of the cover members—and without flexible deformation of these cover members being necessary. This is achieved in the cover according to the invention with the partially cylindrical configuration of the areas of contact of the cover members, as will be explained in more detail on the basis of practical examples.

The construction principle upon which the cover according to the invention is based is suitable for covers for the protection of guideways and similar equipment, as well as for covers for accommodating power supply lines. While in the first case the cover is left open at its lower side as a matter of course, the cover for accommodating power supply lines has its two sling chains connected by rigid cover members as is expedient both in the upper region of the cover and in its lower region. Of course, the cover members located at the lower side are provided with a partially cylindrical area of contact.

As the cover according to the invention enables complete accident prevention to be attained in a simple manner (as will be explained in more detail on the basis of the practical examples), and can be economically fabricated, the present cover arrangement fulfils all of the above-mentioned requirements (a to d).

BRIEF DESCRIPTION OF THE DRAWINGS

FIG. 3 is a side view of a first embodiment of the cover according to the invention;

FIGS. 6 to 11 are diagrammatic representations serving to explain various embodiments of the invention.

DESCRIPTION OF THE PREFERRED EMBODIMENTS

Figure 1:
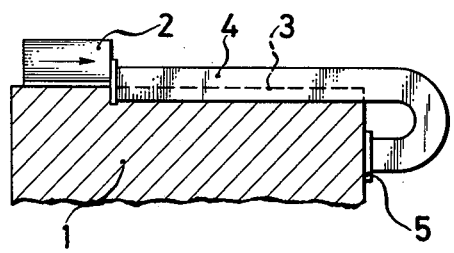
FIGS. 1 and 2 are diagrammatic representations for explaining the functioning of a movable cover.
Figure 2:
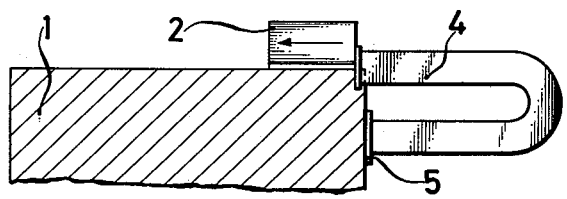

With the aid of FIGS. 1 and 2 a general explanation is given first of all of the flexible cover according to the invention.

A slide 2 is mounted for reciprocating movement along a guideway 3 on a machine tool bed 1. A flexible, movable cover 4 serves to protect the guideway 3 (for example, from hot turnings), one end of the cover being attached to the slide 2 and the other end to the bed 1. The cover 4 is designed to be self-supporting so that it freely projects from the bed 1 in a cantilever fashion, in the position illustrated in FIG. 2.

Another use of the cover according to the invention is as follows: If the movable slide 2 (or any other movable machine part) is to be supplied with power from a fixed position (for example, position 5 on bed 1), then the power supply lines that are provided for this purpose are appropriately accommodated in a movable cover (as in 4) which forms a self-supporting power supply chain.

Figure 4:
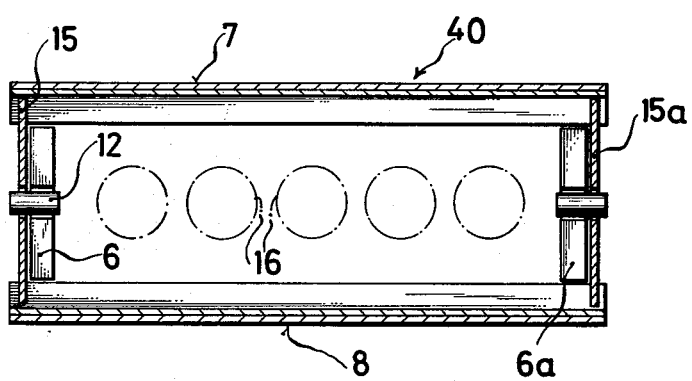
FIG. 4 is a section of the cover of FIG. 3.

A first practical example of the cover according to the invention is explained in more detail with the aid of FIGS. 3 and 4, more specifically, in a construction for housing power supply lines.

The cover 40 largely comprises two sling chains 6, 6a which are connected together by rigid cover members 7, 8.

The two sling chains 6, 6a (the following only describes sling chain 6 in more detail) consist of chain links 9, 9' which have trapezoidal front edges 10, 11 or 10', 11' which form stops for limiting the extended position and the minimum radius of curvature of the chain. Adjacent chain links are hinged together by bolts 12; the connecting hinge pin has been designated 13.

As illustration not contained in the drawing is the type of offsetting of flanging of the individual chain links 9, 9' (as this is not essential for an understanding of the present invention), which ensures that the co-operating front stop edges (e.g. 10, 10' and 11, 11') are aligned with respect to each other.

While the sling chains 6, 6a constitute the two side arms of the cover, the upper side of the cover is formed by a plurality of rigid cover members 7 of the shape depicted in FIG. 3. Each of these cover members 7, which have the same configuration, comprises a central, straight section 7a and two outer sections 7b, 7c. The section 7b forms part of the cylindrical surface around the connecting hinge pin 13 (the same applies to the section 7c, which forms part of the cylindrical surface surrounding the connecting hinge pin).

The cover members 7, 7' of adjacent units of the cover overlap to grip in sliding engagement with their partially cylindrical sections (e.g. 7b, 7c) of somewhat differing diameters, whereby a sliding contact surface is formed between these partially cylindrical section (e.g. 7b, 7'c).

The gap (e.g. 14) formed between the co-operating front edges (e.g. 11, 11') of adjacent chain links is covered when viewed from the exterior of the cover by a circular disc 15, 15a, in each case, which is secured to the bolt 12 so that its axis coincides with that of the connecting hinge 13. The diameter of this disc 15 (the same applies to disc 15a) corresponds to the internal diameter of the partially cylindrical section 7b of the cover member 7 and consequently supports the partially cylindrical sections 7b, 7'c.

The two sling chains 6, 6a are connected at the lower side of the cover by the rigid cover members 8, which likewise consist of a straight, central section 8a and two cylindrical sections 8b, 8c. The axis of the partially cylindrical section 8b again coincides with the connecting hinge pin axis 13. The rigid cover members 8, 8' of adjacent cover sections overlap to grip in sliding engagement with their curved portions (e.g. 8b, 8'c) in the manner apparent in FIG. 3.

The dimensions of the partially cylindrical sections 7b, 7c and 8b, 8c of the cover members 7 and 8, respectively, are chosen so that the upper side as well as the lower side of the cover arrangement forms a completely integral surface, both in the extended position and in the position of maximum curvature, and yet so that the curved portions of the cover members 7, 8 do not freely protrude into the interior space surrounded by the cover members.

The drawing does not include elements (such as cross pieces) which can be provided at selected intervals in the cable duct to secure the power supply lines 16, said duct being formed by the cover sections of the cover 40. The sections 7a, 8a can be profiled in an appropriate manner to house these crosspieces.

Figure 5:
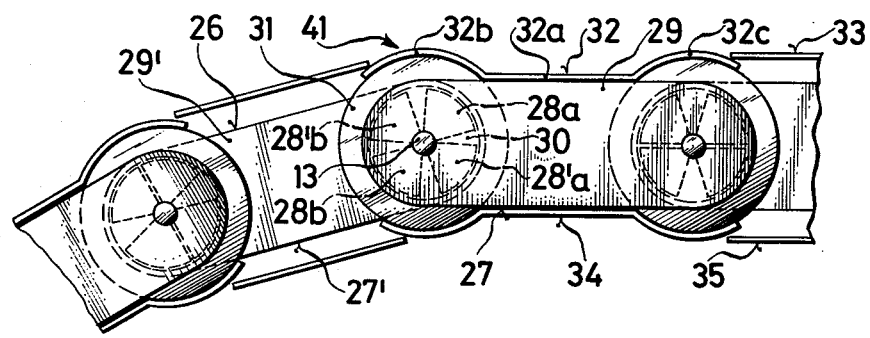
FIG. 5 is a side view of a second embodiment of the cover according to the invention.

FIG. 5 depicts another embodiment of the invention which is a modification of the above-mentioned practical example with regard to the configuration of the sling chains, as well as with regard to the rigid cover members.

The two sling chains 26 of the cover 41 comprise chain links such as are described in detail, for example, in the published German patent application No. 23 58 451. The individual chain links 27 are furnished with sector-shaped limiting stops (e.g. 28a, 28b, and 28'a, 28'b), which are secured to fishplates 29, 29' which externally cover the gap formed between co-operating stops (for example, gap 30 between stops 28a, 28'a).

Towards the periphery, these gaps formed between co-operating stops are covered by a guard ring 31, the internal diameter of which corresponds approximately to the external diameter of the sector-shaped limiting stops. While the limiting stops 28a, 28b and 28'a, 28'b are firmly affixed to the fishplate 29 or 29' supporting them, the guard ring 31 can either be firmly attached to a fishplate or can be loosely positioned between the fishplates.

In the case of the practical example shown in FIG. 5, the pairs of chain links which are positioned at either side of the cover are connected together at the top by rigid cover members 32, 33 which, in contrast to the practical example previously described, do not have the same configuration. The cover member 32 comprises a central straight portion 32a at each end of which a partially cylindrical portion 32b or 32c is connected. The axis of curvature of these partially cylindrical sections again coincides with the axis of the connecting hinge pin (for example, 13).

The cover member 33 provided on the upper side of the adjoining cover unit consists solely of a straight portion; its edge rests on the external side of the adjacent curved portion (for example, 32c) of the following cover member 32 so as to provide sliding line contact.

The external diameter of the guard ring 31 corresponds to the internal diameter of the partially cylindrical portion 32b of the cover member 32.

The rigid cover member 34, 35 provided at the lower side of the cover 41 are of the same design as the corresponding cover members 32, 33 on the upper side: The cover member 34 has two partially cylindrical, curved portions connected to its straight central portion, while the cover member 35 is of straight configuration. Moreover, the dimensions of the cover members 32, 33, 34 and 35 are selected so that the interior of the cover 41 is sealed off properly from the outside both in its extended position and in all swivelling positions of the cover, and the interior of the cable duct is not constricted.

At this point it is emphasized that the two variants, as explained with the aid of FIGS. 3 and 5, have rigid cover members at their upper and lower sides and can, of course, be combined with every type of sling chain (which form the two lateral sides of the cover): Hence sling chains of the type indicated in FIG. 5 can be connected up with rigid cover members of the type of construction in FIG. 3. Furthermore, combinations of the cover members depicted are possible with sling chains in which the angles of traverse of adjacent chain links are limited by stop pins that are movable in circular slotted holes.

FIGS. 3 to 5 illustrate two practical examples of covers for housing power supply lines. In the case of such covers, the interior can be expediently completely enclosed (by closing the cover with rigid cover members at the lower side). In order to achieve adequate ventilation (to prevent heating of cables) appropriate ventilation ducts can be provided in the individual walls of the cover sections, preferably in the two sling chains.

If the cover according to the invention is to be employed for protecting guideways, spindles or similar machine parts, then the two sling chains which form the lateral sides of the cover need only be connected together by means of upper rigid cover members, as a rule. The cover members 8, 8' in FIG. 3, and the cover members 34, 35 in FIG. 5 can be dispensed with. Beyond this, the construction remains essentially unchanged.

Figure 6:
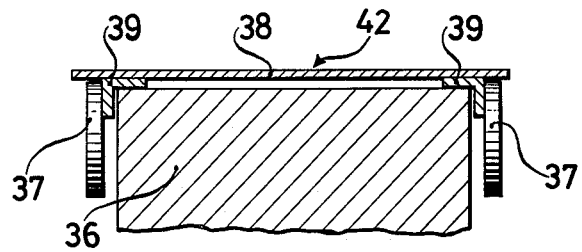

FIG. 6 shows a cover 42 for the protection of a guideway 36. The two sling chains are designated as 37 and the connecting, rigid cover member as 38. The cover 42 is supported on the guideway 36 by glides (39). These glides can naturally be replaced by supporting or guide rollers.

Figure 7:
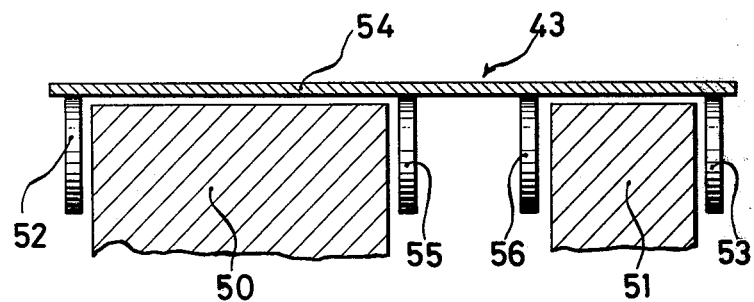

FIG. 7 illustrates an embodiment of the invention in which a single cover 43 serves to protect two guideways 50, 51. Two additional sling chains 55, 56 are provided between the two sling chains 52, 53 forming the lateral sides of the cover 43 for the purpose of supporting the rigid cover member 54 which runs across the whole width of the cover. However, it is possible to dispense with one of the two sling chains 55, 56.

Figure 8:
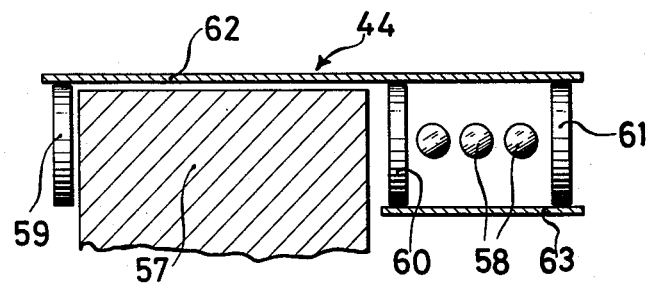

FIG. 8 shows a practical example in which a cover 44 serves both as a cover for a guideway 57 and as a cover for housing power supply lines 58. The cover 44 contains three sling chains 59, 60, 61, of which the chains 59 and 60 lie on either side of the guideway, while the chains 60 and 61 limit the space taken up by the power supply lines 58.

At the upper side of the cover 44, rigid cover members 62 are provided over the whole width of the cover. The chains 60, 61 are, moreover, connected to each other at the lower side of the cover by rigid cover members 63.

All of the practical examples of the invention that have been described exhibit an extraordinary stiffness of construction, complete protection against accidents, and simple, economical fabrication.

FIG. 9 depicts a cover 45 for a guideway 62 of a machine tool bed 63, along which a slide 64 can be moved to and fro. In constrast to the practical embodiments of the invention that have previously been described, the cover 45 in this case has its two ends secured to the two ends 64a and 64b of the slide 64. The cover 45 is for this purpose led underneath the bed 63 (for example, in a recess 66 on the lower side of the bed 63, or in an underfloor conduit).

The cover 45 as in the case of the previously described practical examples comprises two lateral cover sides formed by the sling chains, as well as rigid cover members which connect the individual links of the sling chains together at the outer side. Moreover, the cover 45 is furnished with outer supporting rollers 67 which are located outside of the two sling chains, the axes of which preferably coincide with the connecting hinge pin axes of adjacent chain links. These outer supporting rollers 67 run on a fixed supporting surface 68 or on machine bearing surfaces and support the cover 45 in the area in which it is led underneath the bed 63.

The cover 45 is in this embodiment of the invention appropriately provided with supporting or guide rollers in the interior of the cover (as indicated by 69) which serve to support and guide the cover on the bed 63. Fixed guide rails 63a, 63b are provided at both ends of the bed 63, around which the cover 45 is led in a curved path. If the slide 64 moves with the cover 45 to the left in the direction of the arrow 65, then the supporting rollers 67 bear against the right-hand guide rail 63a, while the supporting rollers 67 are slightly raised off the left-hand guide rail 63b (in this region, the curvature of the cover 45 is consequently determined by the sling chains). In conjunction with the supporting rollers 67, the guide rails 63a, 63b ensure the cover 45 runs smoothly and jolt-free on transferring from the deflection zone to the upper side of the bed 63. 68a and 68b finally designate discharge openings through which turnings (or other foreign matter) that have fallen onto the upper side of the cover 45, which are thrown off from the cover in the deflection zones, can be appropriately carried away.

It is to be understood that the outer supporting rollers 67 only need to be provided in that part of the length of the cover which comes to rest on the horizontal supporting surface 68 and on the bearing surfaces 63a and 63b. It is also clear that the central part of the cover 45 which is always located underneath the bed 63—irrespective of the position of the slide 64—where it is in aligned position, and never passes into the curved deflection zone, can be designed to assume a simple form (e.g. that of pull rods), as these parts of the structure do not have to assume a curved shape and also do not provide any covering function.

A particular advantage of the embodiment of the invention according to FIG. 9 is that the distance between successive connecting hinge pins can be relatively large (which considerably simplifies the construction of the two sling chains), as a relatively large radius of curvature can be chosen in the region of the two deflection zones at the ends of the bed 63.

It should also be pointed out that the cover according to the invention can be furnished with appropriate wipers in order to prevent the infiltration of foreign matter, e.g. turnings, into the interior of the cover. In the practical example shown in FIG. 3, such wipers are appropriately affixed to the portions 7c and 8c of the cover members 7 and 8 (and, more specifically, in the proximity of the outer edge of these portions), so that they glide on the cylindrically curved portions of the adjacent cover members. In the practical example rendered by FIG. 5, the wiper elements are attached to the rectilinear cover members 33, 35 and thereby rest on the exterior of the curved portions of the cover members 32 and 34.

Figure 10:
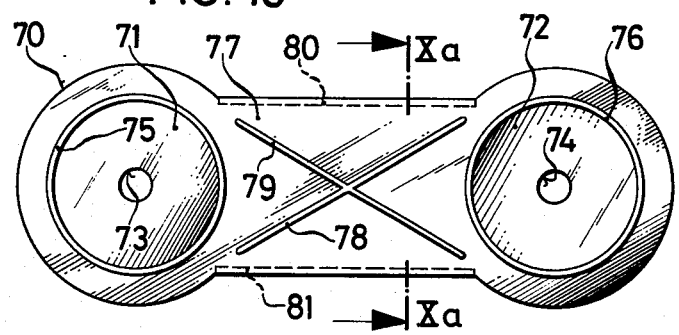
Figure 10A:
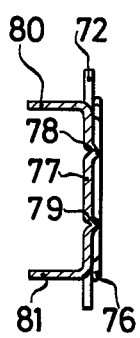

FIG. 10 illustrates an appropriate fishplate construction 70 which comprises part of a sling chain (with sector-shaped limiting stops), as depicted in the embodiment of the invention shown in FIG. 5. For the sake of simplicity, the sector-shaped limiting stops which are secured to the fishplate are not illustrated in FIG. 10.

The fishplate 70 contains two swivel joint zones 71, 72 each having a bore-hole 73, 74 for accommodating a tie bolt. A circular stiffening corrugation 75, 76 is featured in each case, positioned concentrically with these bore-holes 73, 74 and hence also concentrically with sling chain links adjacent to the connecting hinge pin in the proximity of the two swivel joint zones 71, 72. The guard ring (reference symbol 31 in FIG. 5) can be furnished with a profiling that is complementary to the stiffening corrugations 75, 76.

In its central region 77 lying between the two swivel joint zones 71, 72 the fishplate 70 features two crossing stiffening corrugations 78, 79. Moreover, the fishplate 70 is bent at this central region 77 along its upper and lower edges. The flanges 80, 81 so formed serve to secure the rigid cover members (for example, cover members 32, 33 and 34, 35 according to FIG. 5).

The cover according to this invention can be made wholly or partly of plastic material.

Figure 11:
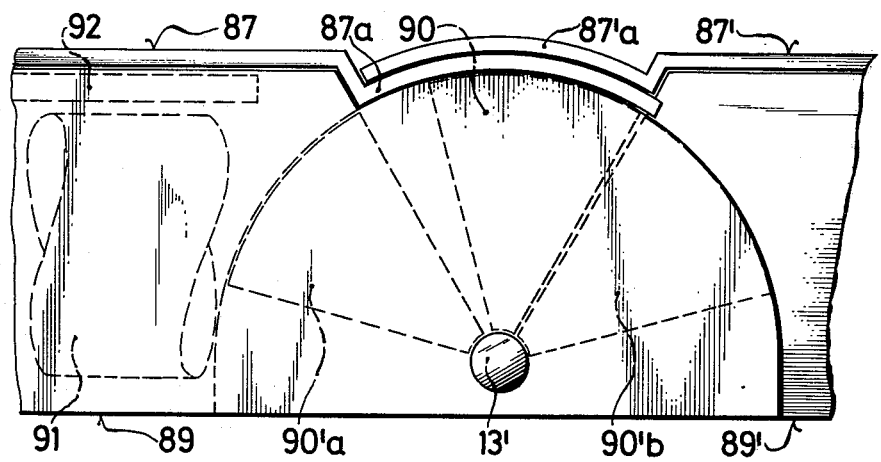

FIG. 11 shows a further embodiment of the invention in which the hinge pin 13' between successive chain links 89, 89' is offset downwards from the median plane, i.e. towards the side opposite to the cover members 87, 87'. This unilateral offsetting of the hinge pin 13' facilitates the attainment of a particularly large radius of curvature for the cylindrically curved areas of contact 87a, 87'a and hence a shallow type of cover construction.

The stops which on the one hand limit the extended position and on the other hand limit the minimum radius of curvature of the cover are formed in this embodiment of the invention as sector-shaped limiting stops 90 (supported by chain link 89) and 90'a, 90'b (supported by chain link 89'). The sector-shaped limiting stops are arranged concentrically with the offset hinge pin 13'.

This embodiment of the invention also allows an intermediate layer 92 to be positioned between the power supply lines 91 and the cover at the top side, which is preferably formed by a band of plastic. This intermediate layer (which can also be provided between the power supply lines, if need be) takes up relative movement between the power supply lines and the cover members 87, 87' in the zones of chain curvature.

We claim:

1. A flexible cover comprising two laterally spaced flexible chains, each of which is composed of links connected by hinge pins, the links of the chains forming lateral sides of adjacent sections of said cover, each link of one chain being connected to an opposite link of the other chain, at least at the top, by a rigid cover member to connect said lateral sides of the cover sections, the rigid cover members defining arcuate end sections which are in sliding contact with the end sections of adjacent cover sections, an arcuate end section of each rigid cover member overlapping the end section of the adjacent cover section with which it is in sliding contact, and adjacent cover sections also being provided with opposed stops which limit the angle of relative pivoting of such adjacent cover sections.

2. A cover according to claim 1 wherein the radii of curvature of the arcuate end sections pass through the respective axes of the hinge pins.

3. A cover according to claim 1 wherein, in each pair of adjacent cover sections, a circular disk is provided which is coaxial with and fits inside said arcuate end section of adjacent cover sections, and which covers the gap between opposed stops on such adjacent cover sections.

4. A cover according to claim 1 wherein each link of one chain is connected only at the top to an opposite link of the other chain by a rigid cover member.

5. A cover according to claim 4 wherein each cover section is provided with supporting and guiding elements.

6. A cover according to claim 4 wherein at least one additional flexible chain is provided, which extends between the two chains forming the lateral sides of the cover, and which acts as an intermediate support for the cover members.

7. A cover according to claim 4 wherein the cover is in the form of a loop having one end connected to one end of a member which is slidably mounted on a guideway, having its other end connected to the other end of such member, and having an intermediate portion extending under such guideway.

8. A cover according to claim 7 wherein the intermediate portion of the loop is provided with supporting rollers, and a supporting surface is provided on which such rollers run.

9. A cover according to claim 7 wherein the cover sections of the loop are provided with supporting rollers, and the guideway is provided at each end with vertically extending arcuate guide rails on which said rollers run.

10. A cover according to claim 4 wherein the hinge pins of each cover section are located below the median horizontal plane of the cover section.

11. A cover according to claim 10 wherein the opposed stops are sector-shaped and are concentric with the offset hinge pins.

12. A cover according to claim 1 wherein a layer of a plastic material is provided below the cover members to protect power supply lines.

13. A cover according to claim 1 wherein each link of one chain is connected to an opposite link of the other chain by a rigid cover member at the top and by another rigid cover member at the bottom the radii of curvature of the arcuate end sections of the top and bottom rigid cover members passing through the respective axes of the hinge pins.

14. A cover according to claim 1 wherein each cover section comprises two side plates each of which has a circular stiffening corrugation concentric with each of the two hinge pins.

15. A cover according to claim 14 wherein each side plate has stiffening corrugations also in its central portion.

16. A cover according to claim 14 wherein the side plates have flanges in their central portions to which the cover members are secured.

* * * * *